Oct. 19, 1965 P. H. SLOAN ETAL 3,212,833
BALL BEARING ASSEMBLY AND METHOD OF MANUFACTURING SAME
Filed Dec. 9, 1963 4 Sheets-Sheet 1
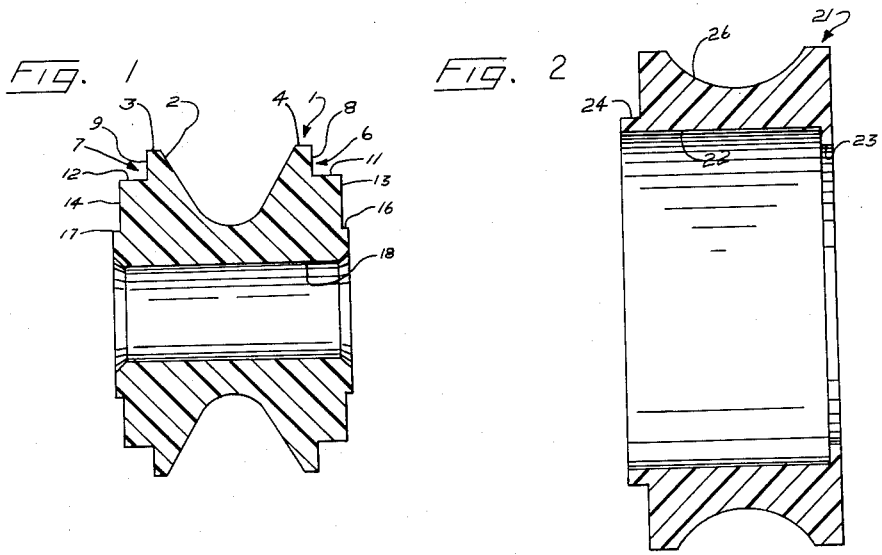
FIG. 1
FIG. 2
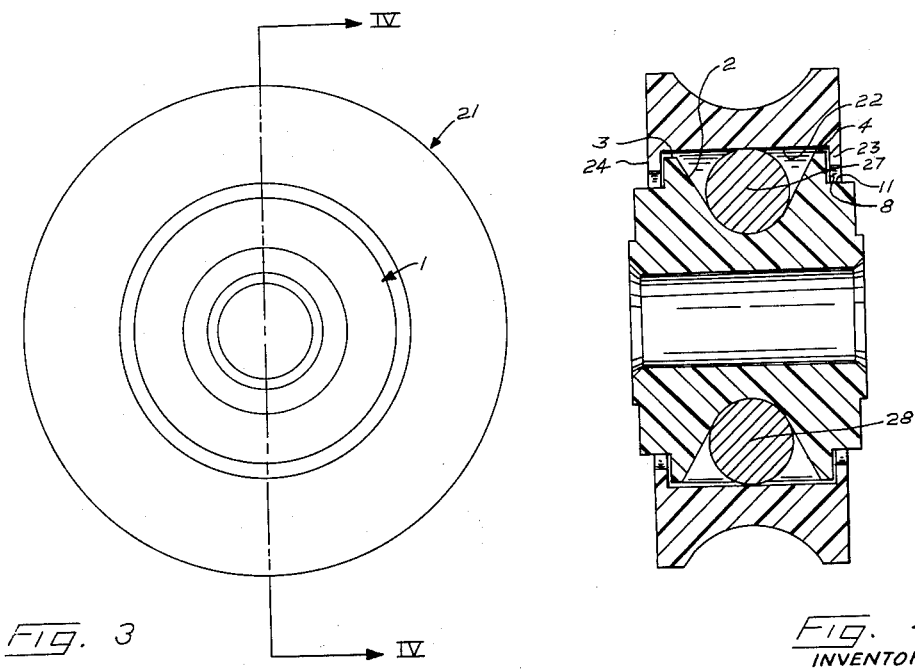
FIG. 3
FIG. 4
INVENTORS,
PAUL H. SLOAN,
BRUCE W. SCHAEFFER,
ORVILLE E. MOWERY, DECEASED,
BY GLIDA M. DAVIS, ADMINISTRATRIX
BY
Woodhams Blanchard and Flynn
ATTORNEYS INVENTORS,
PAUL H. SLOAN,
BRUCE W. SCHAEFFER,
ORVILLE E. MOWERY, DECEASED,
BY GLIDA M. DAVIS, ADMINISTRATRIX
BY
Woodhams Blanchard and Flynn
ATTORNEYS INVENTORS,
PAUL H. SLOAN,
BRUCE W. SCHAEFFER,
ORVILLE E. MOWERY, DECEASED
BY GLIDA M. DAVIS, ADMINISTRATRIX
BY

ATTORNEYS

Oct. 19, 1965  P. H. SLOAN ETAL  3,212,833
BALL BEARING ASSEMBLY AND METHOD OF MANUFACTURING SAME
Filed Dec. 9, 1963  4 Sheets-Sheet 4

INVENTORS
PAUL H. SLOAN
BRUCE W. SCHAEFFER
ORVILLE E. MOWERY, DECEASED
BY GLIDA M. DAVIS
ADMINISTRATRIX
BY Woodhams, Blanchard and Flynn
ATTORNEYS

United States Patent Office 3,212,833
Patented Oct. 19, 1965

3,212,833
BALL BEARING ASSEMBLY AND METHOD OF MANUFACTURING SAME
Paul H. Sloan, Sturgis, and Bruce W. Schaeffer, Fawn River Township, St. Joseph County, Mich., and Orville E. Mowery, deceased, late of Three Rivers, Mich., by Glida M. Davis, administratrix, Three Rivers, Mich., assignors to Kirsch Company, Sturgis, Mich., a corporation of Michigan
Filed Dec. 9, 1963, Ser. No. 328,792
7 Claims. (Cl. 308—195)

This application is a continuation-in-part of patent application Serial No. 60,130, filed October 3, 1960, now abandoned.

This invention relates to a ball bearing assembly and particularly to a ball bearing which is devised so as to make it easy to insure a full complement of balls in the assembled bearing.

In making ball bearings, it has long been recognized that the provision of a full complement of balls within the bearing races is desirable from several standpoints, referring particularly to smoothness of operation, accuracy of alignment and minimizing of wear. However, this is not easy to achieve, particularly when low cost, high production rates are required. This has long been recognized and many attempts have been made to solve this problem by providing special ball bearing designs and methods of assembling same. Most of these attempts have involved distorting, i.e. flexing, either the inner or the outer part of the bearing in various ways and others have proceeded on the basis of providing two separate parts for either the inner or the outer race, which parts could be joined after the race was filled with a full complement of balls. However, none of these approaches has been well adapted to high-speed, low-cost production techniques and accordingly none of them has been considered to be a final answer to the problem.

This problem is further complicated when it becomes desirable to make either or both of the inner and outer bearing races from a plastic material. Particularly in small bearings, it has been popular for a considerable period of time to make same from various kinds of self-lubricating plastics, such as nylon. This has many obvious advantages which are well understood and which have been used in the past in a variety of circumstances. However, in attempting to create a bearing made in whole or in part from nylon and in which it is easy to insure a full complement of balls by a rapid and low-cost assembly procedure, the techniques of the prior art have proved totally inapplicable.

Accordingly, the objects of the invention are:
(1) To provide a ball bearing assembly having a full complement of balls therein.
(2) To provide a ball bearing assembly, as aforesaid, wherein said full complement of balls may be provided without distorting, such as flexing, either the inner or the outer race of the bearing during the assembly process.
(3) To provide a ball bearing assembly, as aforesaid, which is capable of receiving a full complement of balls and wherein either or both of the inner and outer races may be made from an organic, synthetic and moldable plastic material.
(4) To provide a ball bearing assembly, as aforesaid, wherein either or both of the inner and outer races are particularly adaptable for manufacture from a self-lubricating plastic material, such as nylon.
(5) To provide a ball bearing assembly, as aforesaid, which is capable of extremely rapid assembly by automatic machinery.
(6) To provide a ball bearing assembly structure, as aforesaid, wherein the bearing, when it is once assembled, will be strong and sturdy and not likely to come apart.
(7) To provide a ball bearing assembly, as aforesaid, which will be extremely simple and will be capable of easy and rapid molding by ordinary injection molding techniques and from relatively inexpensive molds.
(8) To provide a ball bearing assembly having dust shields, as aforesaid, consisting, in addition to the balls, of only two parts.
(9) To provide a ball bearing assembly, as aforesaid, wherein the assembly steps can be carried out by relatively simple machinery which can be arranged for automatic operation and which can be performed at a relatively low cost but at a high speed of operation and a high degree of effectiveness to produce accurately made, strong, and wholly reliable bearings.

Other objects and purposes of the invention will be apparent to persons acquainted with devices of this general sort upon reading the following disclosure and inspection of the accompanying drawings.

In the drawings:
FIGURE 1 is a central sectional view of the inner member of the bearing to which the invention relates.
FIGURE 2 is a central sectional view of the outer member of the bearing, said outer member being shown as it appears prior to assembly of the bearing.
FIGURE 3 is a side elevational view of the assembled bearing.
FIGURE 4 is a sectional view taken on the line IV—IV of FIGURE 3.
FIGURE 5 is a central sectional view of the inner and outer members of the bearing, as they appear in the first step of their assembly, together with apparatus for effecting such assembly.
FIGURE 6 is a view similar to FIGURE 5 showing the condition of the parts in the second step of their assembly wherein the ball valve is being opened.
FIGURE 7 is a view similar to FIGURE 5 showing the condition of the parts in the third step of their assembly wherein the ball valve is completely opened and the balls are in position for entering into the bearing race of the inner member.
FIGURE 8 is a view similar to FIGURE 5 and shows the fourth step of the assembly process.
FIGURE 9 is a view similar to FIGURE 5 and showing a fifth step of the assembly process, the inner and outer members being telescoped together with the balls in position.
FIGURE 10 is a view similar to FIGURE 5 showing a sixth step of the assembly procedure wherein telescoping of the inner and outer members is completed.
FIGURE 11 is a view similar to FIGURE 5 with the ball-supplying structure replaced by a first flange-closing spinning die and showing a seventh step of the assembly procedure.
FIGURE 12 is a view similar to FIGURE 11 with the first spinning die being replaced by the final flange-closing spinning die and showing the final step in the assembly procedure.
FIGURE 13 is a side elevational view of a modified bearing assembly embodying the invention.
FIGURE 14 is a sectional view taken along the line XIV—XIV in FIGURE 13.
FIGURE 15 is a central, sectional view similar to that shown in FIGURE 14 prior to the completion of the assembly procedure.

*General description*

The ball bearing assembly of the invention comprises an outer member having a cylindrical opening and an inner member having at least one peripheral groove in which the bearing balls are received. One inwardly extending, relatively rigid flange is provided on the outer member at one axial end thereof for engaging the inner member and holding same against axial movement with respect to the outer member. A second flange, which initially extends axially, is provided on the other end of said outer member and is so disposed that it does not interfere with the the telescoping of the inner and outer bearing members during the assembly operation. After this telescoping is completed, the second flange is spun into a relatively rigid position where it extends radially inwardly substantially prependicular to the axis of the bearing.

The bearing of the invention is assembled by moving the inner bearing member into the lower end of the central opening of a ball-supplying fixture having a downwardly tapered, conical, internal wall and releasing into the groove in said inner member bearing balls in sufficient number to insure a full complement thereof for the bearing. The inner member is then lowered into the cylindrical opening in the outer member and the balls follow in part by gravity and in part by the impelling of the upper flange of the bearing-receiving groove. After the inner member is fully received within the outer member suitable spinning means are then applied to the second, axially extending flange of the outer member for bending it into a radial position whereby it cooperates with the first, fixed flange for holding the inner and outer bearing members against axial movement with respect to each other. The frictional heat developed between the second flange and the spinning tool, during the spinning operation, temporarily softens the second flange and thereby facilitates the spinning operation.

The modified bearing assembly (FIGURES 13, 14 and 15) illustrates the invention as applied to a pulley construction in which the bearing has two spaced and coaxial rows of bearing balls.

*Detailed description*

Figure 5:
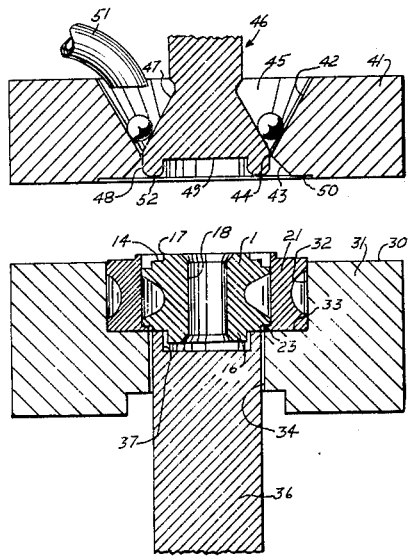

Referring first to the construction of the parts of the bearing assembly, the inner member 1 shown in FIGURE 1 is of generally cylindrical shape having a deep and wide circumferential groove 2 therein which is of such width as to leave relatively narrow annular lands 3 and 4 on the periphery thereof. Annular notches 6 and 7 are provided at the opposite axial ends of the inner member and define radially extending surfaces 8 and 9 and axially extending surfaces 11 and 12. The radially extending end surfaces 13 and 14 constitute the axial ends of the inner bearing member although hub-like extensions 16 and 17 may be provided, if desired, for spacing the bearing from other adjacent means, such as the flanges of a bearing-supporting device. A cylindrical central opening 18 is provided through the inner member 1 concentric with the groove 2, peripheral lands 3 and 4 and axially extending surfaces 11 and 12.

Referring to FIGURE 2, the outer bearing member 21 has a cylindrical central opening 22 therein. The diameter of the central opening 22 is only sufficiently greater than the diameter of the peripheral lands 3 and 4 of the inner member 1 as to provide an easy clearance space therebetween. An inwardly extending, relatively rigid flange 23 is provided at one end of the central opening 22 and an axially extending, generally cylindrical flange 24 is provided at the other end of said cylindrical opening. In its initial position, namely, that shown in FIGURE 2, the inner diameter of said flange 24 is equal, or substantially equal, to the diameter of the central opening 22.

The outer surface of the outer member 21 is contoured in whatever manner is desired to adapt same to the use intended for the bearing assembly. In this embodiment the bearing assembly is intended to operate as a free-running pulley for supporting a traverse rod cord and, accordingly, an external groove 26 having a rounded bottom is provided in said outer member 21. Said groove 26 is, however, present only because of the particular use of the bearing assembly, herein used to illustrate the invention, and said groove may be replaced by a smooth cylindrical surface if the assembly is intended to be used as a roller, by a toothed surface if it is intended to operate as a free-running idler gear, by a tire-receiving structure if such is appropriate, or by whatever else is desired to adapt the bearing assembly to its intended use.

In FIGURE 4, the inner and outer members are shown assembled together and suitable bearing balls are received within the ball-retaining groove 2. As shown here, the lands 3 and 4 are within the wall defining the central opening 22 and clear same by only a convenient clearance distance. The balls, of which two are shown at 27 and 28, are received within the groove 2 and are of such diameter as to bear snugly against both the bottom of said groove and the wall defining the central opening 22. As shown in FIGURE 4, the radially outermost part of the groove 2 may be substantially wider than the diameter of the balls 27 and 28. The flange 23 is received into the notch 6 with its radially inner edge clearing the axially extending surface 11 and its axially inner surface spaced from the radial surface 8 by an amount sufficient to provide a free-running clearance.

The flange 24 has been bent inwardly in FIGURE 4 and assumes a position with respect to the walls 9 and 12 of the notch 7 which is substantially identical to that above described with respect to the flange 23 and the notch 6. The manner in which the flange 24 is bent into the position shown in FIGURE 4 will be described further hereinafter when reference is made to the assembly procedure of the invention. Thus, the outer bearing member 21 is supported on the inner bearing member 1 only by the balls, as shown, and axial movement of said outer bearing member with respect to said inner bearing member is prevented by the flanges 23 and 24, respectively, engaging the radial surfaces 8 and 9. It will be further recognized that the axially inner surfaces of said flanges 23 and 24 will at all times be sufficiently close to the surfaces 8 and 9 to provide a reasonably effective dust and/or dirt seal so that the entry of foreign materials into the bearing races will be minimized.

Since neither the inner nor the outer bearing members have more than a relatively minor sliding contact with each other, since this can occur only at the flanges 23 and 24 and the parts respectively contacted thereby, it will be seen that there is a great freedom of choice in choosing materials for said inner and said outer members. However, this freedom of choice is limited in certain respects as will be discussed further hereinafter.

Turning now to the assembly procedure for the bearing above described, which comprises an important facet of the invention, attention is directed to FIGURES 5 to 12, inclusive. While the specific means by which the bearing parts are assembled may take several forms to fit various assembly problems and requirements, in order to facilitate a full understanding of the invention, the assembly mechanism will be described in sufficient detail to render the assembly steps readily apparent.

The assembly mechanism (FIGURE 5) comprises a holding member 31 having a stepped central opening therein. The upper portion of said central opening defines a recess 32 which is arranged to receive the inner and outer members 1 and 21 of the bearing in telescoped position with respect to each other. The outer member 21 rests upon the shoulder 33 of said holding member 31 and the inner member 1 rests upon the flange 23 of said outer member 21. A lower portion 34 of said central opening is of reduced diameter approximately equal to the diameter of the radially inner surface of the flange 23. The lower portion 34 receives a ram 36 having a central recess 37 at the upper end thereof for receiving the extension 16 therein. Such extension 16 thereby functions to center the member 1 on the upper end of the ram 36. Where the extension 16 is not used, then such centering may be accomplished by providing a suitable projection on ram 36 which can extend into the opening 18 of said inner member.

Thus, the holding member 31 and parts associated therewith provide a bearing assembly support which may be presented as desired to the processing stations to be hereinafter described. Such presenting will normally be done by automatic machinery such as by a suitably driven and controlled turntable having a plurality of such holding devices 31 arranged around its upper surface.

Figure 9:
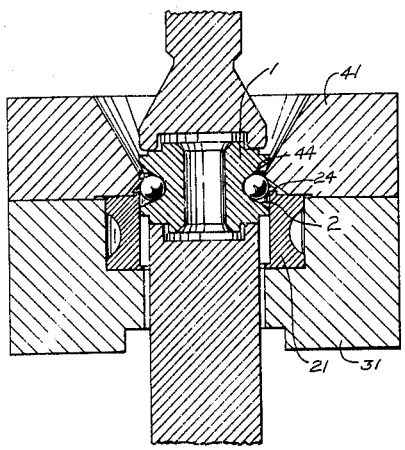
Figure 10:
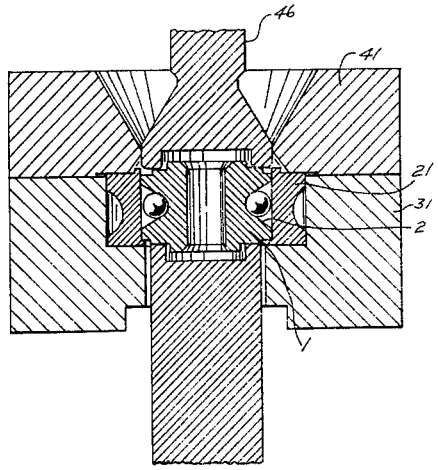
Figure 11:
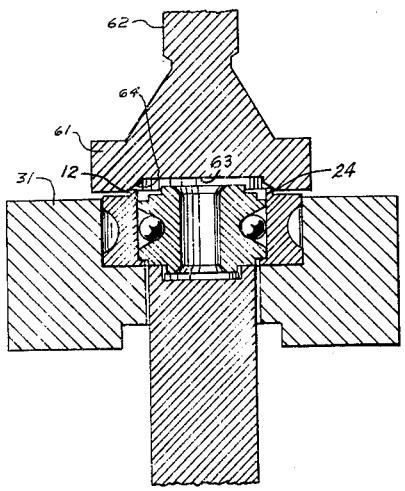
Figure 12:
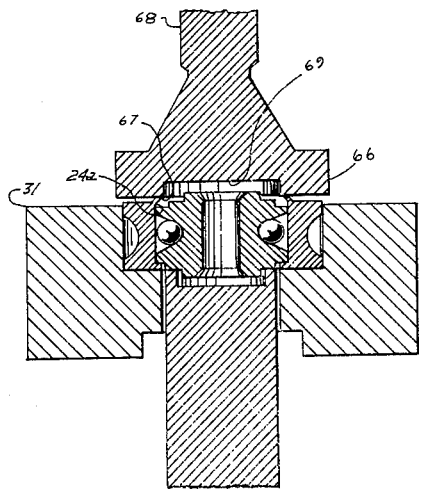

The processing stations, to which said holding member 31 and the bearing parts contained therein are presented, consist of a ball-filling mechanism illustrated in FIGURES 5 to 10, inclusive, and the flange-closing mechanism illustrated in FIGURES 11 and 12. It will be noted at this point that there are only two operations performed on the inner and outer bearing parts after their placement in telescoped positions with respect to each other within the recess 32 as shown in FIGURE 5. This greatly facilitates rapid and accurate manufacture of the bearings in question and correspondingly minimizes their cost.

The ball-filling station includes a ring plate 41 having a downwardly converging, conical central opening 42 therein. A lower, upwardly converging, conical central opening 43 extends upwardly from the lower side of said ring plate 41 and a relatively small cylindrical throat 44 connects the lower end of the upper conical opening 42 with the upper end of the lower conical opening 43.

Normally the holding member 31 will be resiliently urged upwardly so that it will yield to the ring plate 41 as same is urged downwardly, but will then follow it upwardly as said ring plate is retracted.

A valve member 46 has a downwardly diverging, externally conical surface 47 which, in the position shown in FIGURE 5, extends to a point closely adjacent the cylindrical throat 44, at which point it connects to a cylindrical surface 48 whose diameter is only sufficiently less than that of the throat 44 to permit the cylindrical portion 48 of said valve member to pass through said throat. The lower end of the valve member 46 is provided with a recess 49 permitting the extension 17 on the bearing inner member 1 to enter thereinto for centering purposes. As in the case of the extension 16, where such extension 17 is not used, the centering function may be obtained by providing a projection from the lower surface of the valve member 46 adapted to enter into the central opening of the inner member 1.

A further recess 50 is provided in the lower surface of the ring plate 41. The recess 50 has a depth equal to the distance that the outer member 21 projects above the upper surface 30 of the holding member 31.

A suitable feeding device indicated schematically at 51 is provided for discharging the bearing balls into the space 45 defined between the upper conical surface 42 of the member 41 and the conical surface 47 of said valve member 46. Any convenient type of feeding mechanism may be utilized for metering the proper number of balls into the feeding device 51 or the same can be done by hand if preferred. A tangential discharge of the balls into the space 45 will assist in arranging said balls substantially evenly around the bottom of said space.

With the inner bearing member 1 telescoped within the outer bearing member 21 and both parts placed into the recess 32 of the holding member 31, as shown in FIGURE 5, the assembly process is ready to commence. The member 31 is brought into position under the ball-loading mechanism and a plurality of balls are placed into the space 45 as shown. With the parts so arranged, the ring plate 41 is caused to move downwardly until it rests against the upper end of the holding member 31 and the lower annular surface 52 of the valve member 46 engages the upper end surface 14 of the inner bearing member 1. The upper surface of the recess 50 engages the upper surface of the outer member 21 substantially simultaneously with the engagement of the lower surface of the ring plate 41 with the upper surface 30 of the holding member 31. At the same time the projection 17 on the inner member 1 enters into the recess 49 of the valve member 46.

Figure 6:
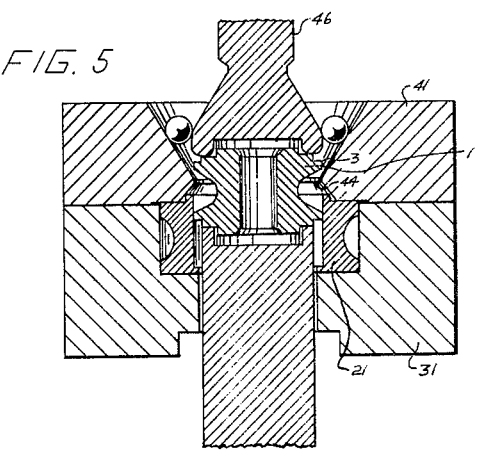

On further downward movement of ring plate 41, the parts will assume the position shown in FIGURE 6 wherein the inner member 1 is partially disposed outside of the outer member 21 and holding member 31. At this time the valve member 46 has been moved above the throat 44 but the balls in space 45 are not yet free to enter the groove 2 in the inner member.

Figure 7:
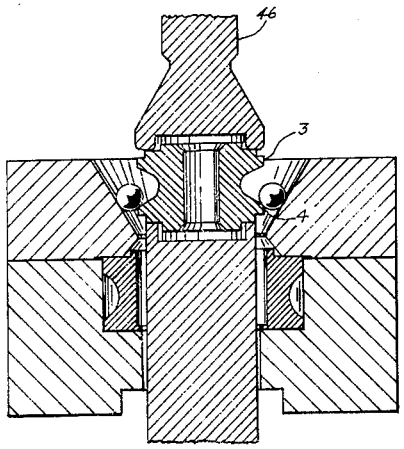
Figure 8:
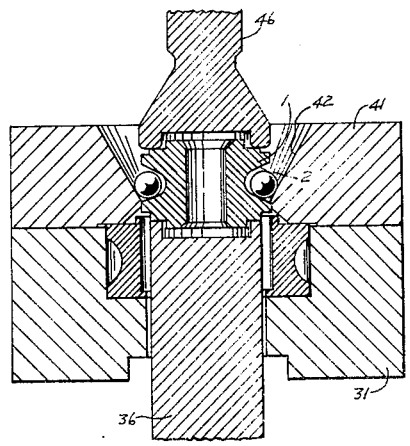

With the continued downward movement of the ring plate 41, the holding member 31 will be pushed further downwardly, as shown in FIGURE 7, and the valve 46 will be pushed upwardly with respect to ring plate 41 far enough that the balls will pass around both said valve member and the upper land 3 of the inner bearing member 1. Movement of the balls will terminate, however, at such a point that said balls will be caught and retained by the lower land 4 of said inner member.

The ring plate 41 is then retracted upwardly and the holding member 31 follows same in constant contact therewith. Thus, with the valve member 46, the inner member 1 and the ram 36 continuing to remain stationary, the parts will assume the position shown in FIGURE 8 wherein the conical surface 42 of the ring plate 41 directs the balls into the groove 2 in the inner member 1.

With continued upward movement of the ring plate 41 and the holding member 31, the parts will assume the position shown in FIGURE 9 wherein the balls are held in place within the groove 2 by the upwardly extending flange 24 which engages said balls and holds them against the bottom of the groove 2 while the upward motion of the outer bearing member 21 with respect to the inner member 1 continues.

FIGURE 10 shows the return of the holding member 31 to its full upward position and the consequent return of the inner member 1 to its fully telescoped position within the outer member 21 with a full complement of balls now in place within the groove 2. The ring plate 41 and the valve member 46 associated therewith are now moved upwardly sufficiently to disengage same from the inner and outer bearing members and the holding member 31 and same are now free to move to the next station.

The holding member 31 with the telescoped inner and outer members and balls contained therebetween, as shown in FIGURE 10, are now moved to stations for spinning the flange 24 into its final position. Normally two spinning heads will be used, as shown in FIGURES 11 and 12. The first spinning head 61 is supported on a shaft 62 adapted for rotation at a rapid but controllable speed by any convenient means. The spinning head 61 is provided with a central recess 63 for receiving the projection 17 and a part of surface 12 of the bearing therein. The central opening 63 has a bevelled corner 64 thereon positioned for engaging the upwardly projecting flange 24. With the head 61 rapidly rotating with respect to the holding member 31, and the bevelled annular surface 64 engaging the upwardly projecting flange 24, sufficient frictional heat will be developed in said flange 24 to soften it temporarily and sufficiently so that it can yield to the urging of the surface 64 and assume the tilted position indicated at 24a in FIGURE 12. This completes the processing by the spinning head 61.

The head 61 is now retracted upwardly to free the holding member 31 and the same is moved to a finishing spinning head 66 which has a spinning surface 67 which is perpendicular to the axis of the shaft 68 but which has a recess 69 for receiving the projection 17 and that part of surface 12 of the bearing assembly which projects upwardly beyond the flange 24 in the assembled bearing unit. The spinning head 66 will now be rotated rapidly with respect to the holding member 31 and frictional heat will again be developed within the flange 24 so that same can temporarily yield and be bent downwardly to assume the finished position thereof as shown in FIGURE 4.

The spinning head 66 is now retracted and the completed bearing removed by any convenient means, such as by an air blast, from the recess 32.

In addition to there being only three steps to be carried out in the above-described assembly operation, it will be recognized that these steps can be carried out very quickly. The steps shown in FIGURES 5 to 10, inclusive, require only a very rapid downward and upward movement of the ring plate 41, holding member 31 and parts associated therewith, and the steps illustrated in FIGURES 11 and 12 can be performed very quickly inasmuch as the flange 24 is warmed sufficiently to render it workable in only a fraction of a second. Thus far, with hand loading of the inner and outer bearing members into the holding member 31, production rates up to 90 bearings per minute have been attained with virtually no rejects resulting from errors in the assembly operation.

It will be seen that since no shaping of the inner bearing member is required, this may be made of metal or thermosetting plastic materials, if desired, to obtain particular strength or operational characteristics, or it may be made of thermoplastic materials. This further extends the versatility of this type of bearing and its method of assembly. However, the materials must be such that there will be no galling between the flanges 23 and 24 and the surfaces 8 and 9, if same should contact.

Further, it will be observed that the outer periphery of the outer member 21 can be made in any of many shapes, as above described, without affecting or interfering with the assembly procedure so that the bearing of the invention and the method of assembly herein described is further versatile in this respect also.

In a preferred embodiment of the invention the outer member 21 is made of a thermoplastic polymer, such as nylon or Delrin, with the balls made of steel. Since the raceway in the internal wall of member 21 is flat rather than being grooved as is conventional, this reduces the initial load-carrying capacity of the bearing. However, as the bearing is used, the internal wall of member 21 is deformed, due to cold flow creep of the thermoplastic, by the balls so that a raceway groove is formed therein. Thus, the load-carrying capacity of the bearing increases with use.

The outer member 21, and particularly its flanges 23 and 24, are sufficiently rigid in their completed, FIGURE 4 positions that the inner member 1 and/or the bearing balls 27 and 28 cannot be inserted into or removed from the outer member without disfiguring the outer member, or moving some part thereof beyond the point where it will return without substantial urging or damage into its FIGURE 4 condition. That is, the bearing assembly disclosed in FIGURE 4 cannot be assembled or disassembled merely by flexing resiliently flexible parts thereof, as taught by the prior art.

*Modified construction*

Figure 13:
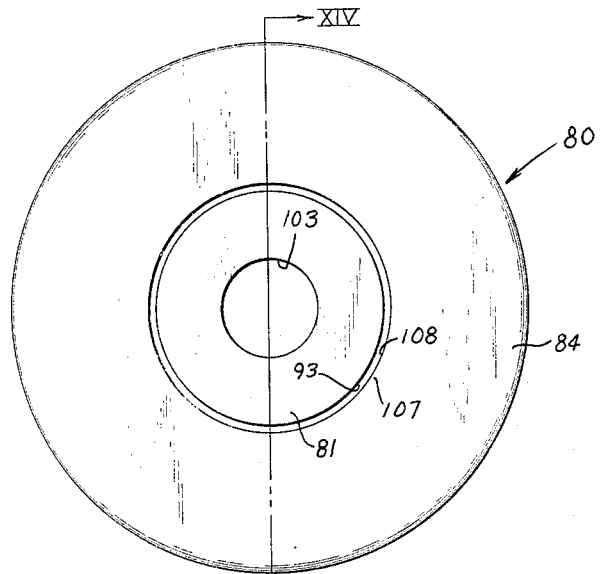
Figure 14:
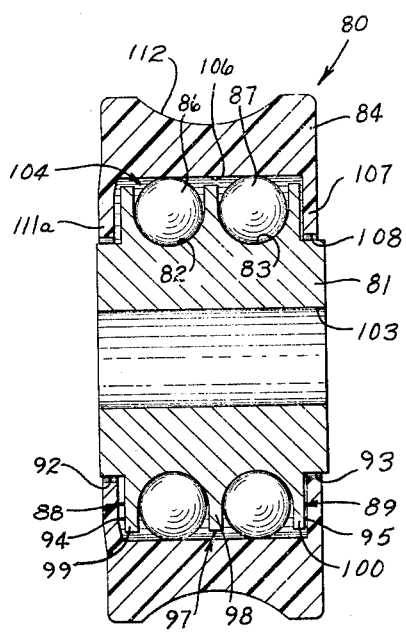
Figure 15:
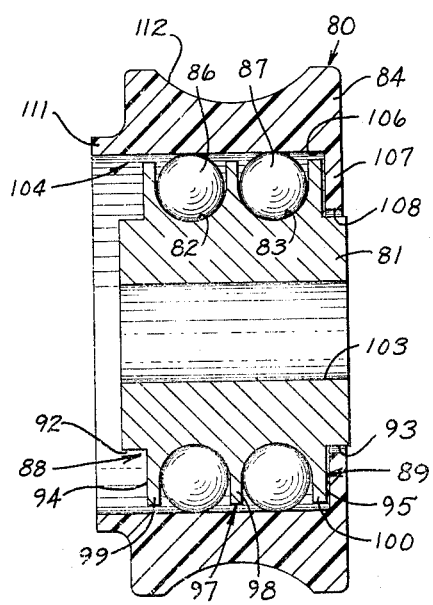

The double row, ball bearing assembly shown in FIGURES 13, 14 and 15 may be substantially identical in all material respects to the bearing assembly disclosed in FIGURE 4 and described above, except for the double row of bearing balls and the increased axial length required to accommodate the two rows. More specifically, the modified bearing assembly 80 consists of a one-piece inner bearing member or race 81 having a pair of annular grooves 82 and 83, a one-piece outer bearing member or race 84 and a plurality of bearing balls 86 and 87 within the grooves 82 and 83, respectively, between the inner and outer members.

The inner member 81 has annular and coaxial notches 88 and 89 in its opposite axial ends which notches correspond to the notches 6 and 7 (FIGURE 1) at the opposite axial ends of the inner member 1. The notches 88 and 89 have radially facing surfaces 92 and 93, respectively, and axially facing surfaces 94 and 95, respectively. The depths of the annular grooves 82 and 83 are slightly less, radially of the inner member 81, than the diameters of the bearing balls 86 and 87 disposed therein. Thus, the bearing balls will project slightly from the grooves 82 and 83 beyond the peripheral surface 97 of the inner member 81, which surface is defined by the outer edge of the annular ridge 98 between the grooves 82 and 83 and the annular ridges 99 and 100 on opposite sides of the grooves 82 and 83. The width of the grooves 82 and 83 need be only slightly greater than the diameter of the bearing balls 86 and 87 to admit their slidable reception. The inner bearing member 81 may be provided with a central, coaxial shaft opening 103. Alternatively, the inner member 81 may be provided with an integral shaft, not shown, extending from the opposite axial ends thereof.

The outer bearing member 84 (FIGURE 15) has a central, coaxial opening 104 which is defined by the inner wall 106. An integral, relatively rigid and annular flange 107 extends radially inwardly from the radial wall 106 adjacent one axial end thereof and has a coaxial opening 108, which is slightly larger in diameter than the radial surface 89 which projects therethrough when the bearing assembly 80 is in its assembled form of FIGURE 14. The diameter of the radial wall 106, hence of the opening 104, is approximately equal to twice the diameter of the bearing balls 86 or 87 plus the diameter of their corresponding grooves 82 and 83. Thus, the inner member 81 is snugly, but rotatably, held by the bearing balls 86 and 87 within the opening 104.

In its preassembled form, the outer member 84 has an axially extended, substantially cylindrical flange 111 (FIGURE 15) which is integral with and extends from the outer member 84 adjacent the opening 104 and on the opposite side of said outer member from the annular flange 107. The inside diameter of the cylindrical flange 111 is preferably approximately equal to the inside diameter of the radial wall 106.

In this particular embodiment, both the inner and outer members are preferably fabricated from a synthetic, thermoplastic material, and the bearing balls are formed from metal. However, it will be recognized that the inner member 81 might be advantageously formed from a metal for certain applications and that substantially the same assembly procedures and operating characteristics would apply.

By means of a spinning operation, as set forth above with respect to the bearing assembly disclosed in FIGURE 4, the cylindrical flange 111 is spun from its position in FIGURE 15 into its position 111a of FIGURE 14 where said flange extends radially inwardly from the radial wall 106 so that it is disposed within the annular notch 88. The bearing balls 86 and 87 are placed within the annular grooves 82 and 83, respectively, by mechanism corresponding to that disclosed in FIGURE 5 prior to the spinning of the flange 111.

The overlap of the inner member 81 by the flanges 107 and 111a and the rigidity of said flanges 107 and 111a will be such that the inner member 81 will be permanently trapped within the outer member 84. That is, it will be impossible to remove accidentally the inner member and/or the bearing balls 86 and 87 from within the outer member 84 without disfiguring or permanently damaging the flanges 107 or 111a or some other part of the bearing assembly. This arrangement is a departure from the prior art wherein assembly or disassembly of the bearing members, where one or both are fabricated from a thermoplastic material, can be effected simply by temporarily flexing part or parts of the bearing assembly, after which said parts will return to their original position due to their inherent resiliency.

The outer peripheral surface of the outer member 84 may be provided with an annular groove 112 so that the bearing assembly 80 can be used as a pulley. However, as discussed above with respect to the bearing assembly of FIGURE 4, the bearing assembly 80 can be used as a roller, as part of a gear, or in some other similar application without departing from the scope of the invention. Also, it will be apparent that, where required or desired, additional rows of bearing balls may be provided in the peripheral surface of the inner member 81 without deviating from the teachings of the invention.

The double row bearing assembly has greater stability and a greater load-carrying capacity than the single row bearing assembly.

While particular preferred embodiments of the invention have been disclosed hereinabove, this invention contemplates such modifications or changes therein as lie within the scope of the appended claims.

What is claimed is:

1. A ball bearing assembly, comprising:
   a one-piece, inner member having oppositely facing, radially outwardly extending surfaces positioned adjacent the opposite axial ends thereof, said inner member being substantially rigid at ordinary temperatures and having annular groove means in its periphery between said surfaces;
   bearing balls disposed in said groove means, said bearing balls being of a diameter only silghtly greater than the radial depth of said groove means so that said bearing balls are substantially completely received within said groove means;
   a one-piece, cylindrical, rigid outer member made from a synthetic, organic, thermoplastic material and surrounding said inner member and said bearing balls, said outer member having a straight internal wall defining a circular, central opening of larger diameter than said inner member and also having an integral, radially inwardly extending, rigid flange at each axial end of said central opening, one of said flanges being formed prior to insertion of the inner member into the outer member, and the other flange being formed by pressure and heat after the inner member is within the outer member, said balls being in rolling engagement with said internal wall so that said inner member is supported by said balls in radially spaced relation to said outer member, the axially inner surfaces of said flanges being overlapped with and being disposed in confronting relationship to said outwardly extending surfaces on said inner member whereby said inner race is permanently and positively held between said flanges.

2. A ball bearing assembly, comprising:
   a one-piece, inner member having oppositely facing, radially outwardly extending surfaces positioned adjacent the opposite axial ends thereof, said inner member being rigid at ordinary temperatures and having annular groove means in its periphery between said surfaces;
   bearing balls disposed in said groove means, said bearing balls being of a diameter only slightly greater than the radial depth of said groove means so that said bearing balls are substantially completely received within said groove means;
   a one-piece, cylindrical, rigid outer member made from a synthetic, organic, thermoplastic material and surrounding said inner member and said bearing balls, said outer member having a straight internal wall defining a circular, central opening of larger diameter than said inner member and also having an integral, radially inwardly extending, rigid flange at each axial end of said central opening, one of said flanges being formed prior to insertion of the inner member into the outer member, and the other flange being formed by pressure and heat after the inner member is within the outer member, said balls being in rolling engagement with said internal wall so that said inner member is supported by said balls in radially spaced relation to said outer member, the axially inner surfaces of said flanges being overlapped with and being disposed in confronting relationship to said outwardly extending surfaces on said inner member, whereby said inner race is permanently and positively held between said flanges.

3. A structure according to claim 2 wherein said inner member is made from a synthetic, organic, thermoplastic material.

4. A structure according to claim 1 wherein said groove means includes a plurality of annular, coaxial grooves spaced from each other, and wherein each of said grooves contains a plurality of said bearing balls which are snugly engaged by the surfaces defining said grooves and the opposing surface defining the central opening in said outer member.

5. A structure according to claim 1 wherein the overlap of the outwardly extending surfaces on said inner member by said flanges is only slightly less than the radial depth of said groove means, so that an accidental removal of the inner member from a completed bearing assembly necessitates a permanent disfigurement of some part of the bearing assembly.

6. A structure according to claim 2 wherein said annular groove means constitutes a single groove.

7. The device defined in claim 2 wherein said annular groove means constitutes multiple grooves.

References Cited by the Examiner

UNITED STATES PATENTS

| | | | |
|---|---|---|---|
| 2,928,701 | 3/60 | Ferdig | 308—190 |
| 2,995,405 | 8/61 | Ferdig | 308—190 |
| 2,998,636 | 9/61 | Spence et al. | 308—195 |

FOREIGN PATENTS

| | | |
|---|---|---|
| 730,426 | 5/55 | Great Britain. |

DON A. WAITE, *Primary Examiner.*

ROBERT C. RIORDON, *Examiner.*